Nov. 25, 1930.   E. FRIED   1,782,417
DEVICE FOR PREVENTING BOILING OVER OF MILK

Filed Jan. 20, 1930

INVENTOR
E. Fried
BY
Sigmund Herzog
ATTORNEY

Patented Nov. 25, 1930

1,782,417

UNITED STATES PATENT OFFICE

EUGENE FRIED, OF NEWARK, NEW JERSEY

DEVICE FOR PREVENTING BOILING OVER OF MILK

Application filed January 20, 1930. Serial No. 422,121.

The present invention relates to a culinary utensil, and more particularly to a device for preventing boiling over of milk or similar fluids.

The devices heretofore in use for the purpose stated are part of the milk boiler or of the cover thereof, and are objectionable for the reason that they are difficult to clean.

The main object of the present invention is to provide a device which is adapted to be placed into a milk boiler, it being in the form of a disk made of non-corroding material, for instance porcelain or the like, and so constructed that it may be readily washed in the manner of an ordinary dish, thereby overcoming the difficulties above referred to.

Another object of the invention is to provide a contrivance of the character mentioned which is simple in construction, efficient in operation, durable in use and capable of manufacture on a commercial scale, or in other words one which is not so difficult to produce as to be beyond the reasonable cost of such a utensil.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
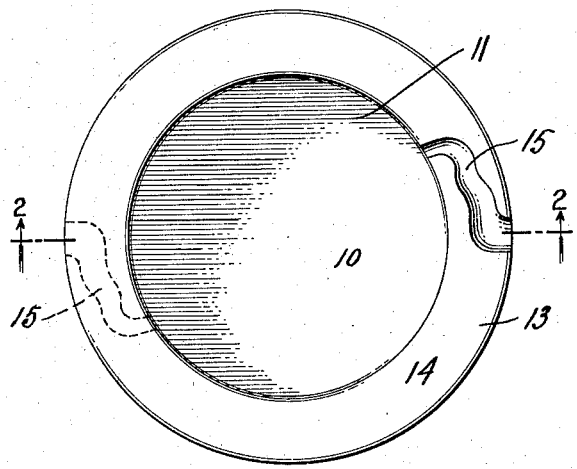
Figure 2:
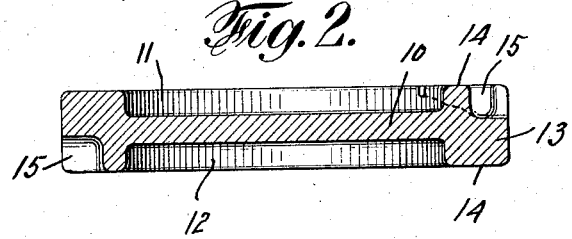

Figure 1 is a top plan view of a device constructed in accordance with the present invention; and Fig. 2 is a section taken on line 2—2 of Fig. 1.

In the drawings the numeral 10 indicates a disk made of a suitable non-corroding material, such as porcelain or glass, adapted to withstand changes of temperature without cracking. This disk is dished or concaved in its upper and lower faces, as indicated at 11 and 12, respectively, it being provided with a rather heavy peripheral rim 13 on its upper and lower faces, either one of which is adapted to rest on the inner surface of the bottom of a milk boiler. The faces 14 of the rims which are in the planes of the upper and lower faces of the disk, are flat so as to contact with the vessel bottom over an extended area in order to make a substantially air-tight closure of the respective concavity in the disk, when the latter rests on a vessel bottom. In the face 14 of each rim is provided a circuitous groove 15, leading from the respective concavity in the disk to the periphery of the latter. The width and depth of each groove gradually increase from the respective concavity to the periphery of the disk, for a purpose hereinafter to be described.

In use, the disk is placed into a vessel or boiler, resting with one of its flat faces on the said bottom. In this manner the lower concavity in the disk is closed but communicates through the respective groove 15 with the interior of the boiler. The diameter of the disk should be smaller than that of the boiler, so that the outlet of the groove of the closed concavity is uncovered. The milk or other fluid to be boiled, is poured into the vessel and finds its way into the closed concavity in the disk. As the vessel is now placed upon the fire and the milk therein heated, the gaseous bubbles within the closed concavity of the disk are prevented from rising suddenly, they being caused to flow through the groove in communication with the closed concavity into the liquid outside of the said concavity, rising slowly whereby boiling over of the milk is prevented. The disk is kept on the vessel bottom by its own weight, it being heavy enough to overcome the pressure created by the gaseous bubbles within the closed concavity. As mentioned above, the width and depth of each groove 15 increase gradually from the respective concavity to the periphery of the disk. Due to this construction, the speed of the gaseous bubbles, as they pass from the closed concavity toward the periphery of the disk, is gradually decreased so that the said bubbles have less tendency to rise suddenly toward the surface of the milk or other fluid.

The device being made of porcelain or glass, as above stated, and the concavities and grooves therein being exposed, the contrivance may be easily cleaned, after use, in the manner of an ordinary dish.

It is obvious that, while herein the device has been shown and described as having in both faces thereof a concavity, a disk with a concavity in one of its faces only may be used without departing from the invention. It is obvious, however, that a disk having a concavity in each face thereof is more convenient because no attention need be paid to the manner in which the disk is placed into a vessel when being put to use.

What I claim is:—

A device for preventing boiling over of milk comprising a disk provided with a concavity in one of its faces having a peripheral rim on said face of substantial width, said rim having a flat face adapted to contact with a vessel bottom, said rim being provided in its flat face with a circuitous groove leading from said concavity to the disk periphery, said groove increasing gradually in width and depth from said concavity to the disk periphery.

Signed at New York city, in the county of New York and State of New York, this 18th day of October A. D. 1929.

EUGENE FRIED.